INVENTORS
WILLIAM PACKARD
FRANK S. DE CARLO
BRUCE FINKELSTEIN
BY
ATTORNEY

United States Patent Office 3,614,895
Patented Oct. 26, 1971

3,614,895
GYRO PLATFORM ERECTION SYSTEM
William Packard, Fair Lawn, Frank S. De Carlo, Westwood, and Bruce Finkelstein, Hackensack, N.J., assignors to The Bendix Corporation
Continuation-in-part of application Ser. No. 717,538, Apr. 1, 1968. This application June 26, 1969, Ser. No. 836,932
Int. Cl. G01c 19/30
U.S. Cl. 74—5.41       9 Claims

ABSTRACT OF THE DISCLOSURE

A gyroscope mounted to a platform gimbal and including a float having a groove and precessing through an angle to contact limiting spring means in the groove, said springs means providing a torque for gyro erection.

CROSS REFERENCE TO RELATED APPLICATIONS

This application is a continuation-in-part of U.S. application Ser. No. 717,538, filed by William Packard, Frank S. DeCarlo, and Bruce Finkelstein on Apr. 1, 1968, and assigned to the Bendix Corporation, assignee of the present invention, and now abandoned.

BACKGROUND OF THE INVENTION

Field of the invention

The invention relates to gyroscopes and more particularly to erection systems for gyroscopes.

Description of the prior art

Presently, gyroscope erection rates are limited by the torque producing capability of gyro torquers which, in turn, is limited by the current carrying capabilities of the torquer windings. In addition, constant excitation impressed on the torquer provides varying thermal gradients internal to the gyro which increase the ambient temperature of the system and produce undesirable thermal perturbations. The present invention overcomes the aforenoted objetcions by using mechanical means in the form of a spring for providing torque.

SUMMARY OF THE INVENTION

The present invention contemplates a gyroscope mouned to a platform gimbal and including a spring in cooperative arrangement with a cutout in a gyro float for providing a torque for erecting the platform gimbal.

DESCRIPTION OF THE PREFERRED EMBODIMENT

Figure 1:
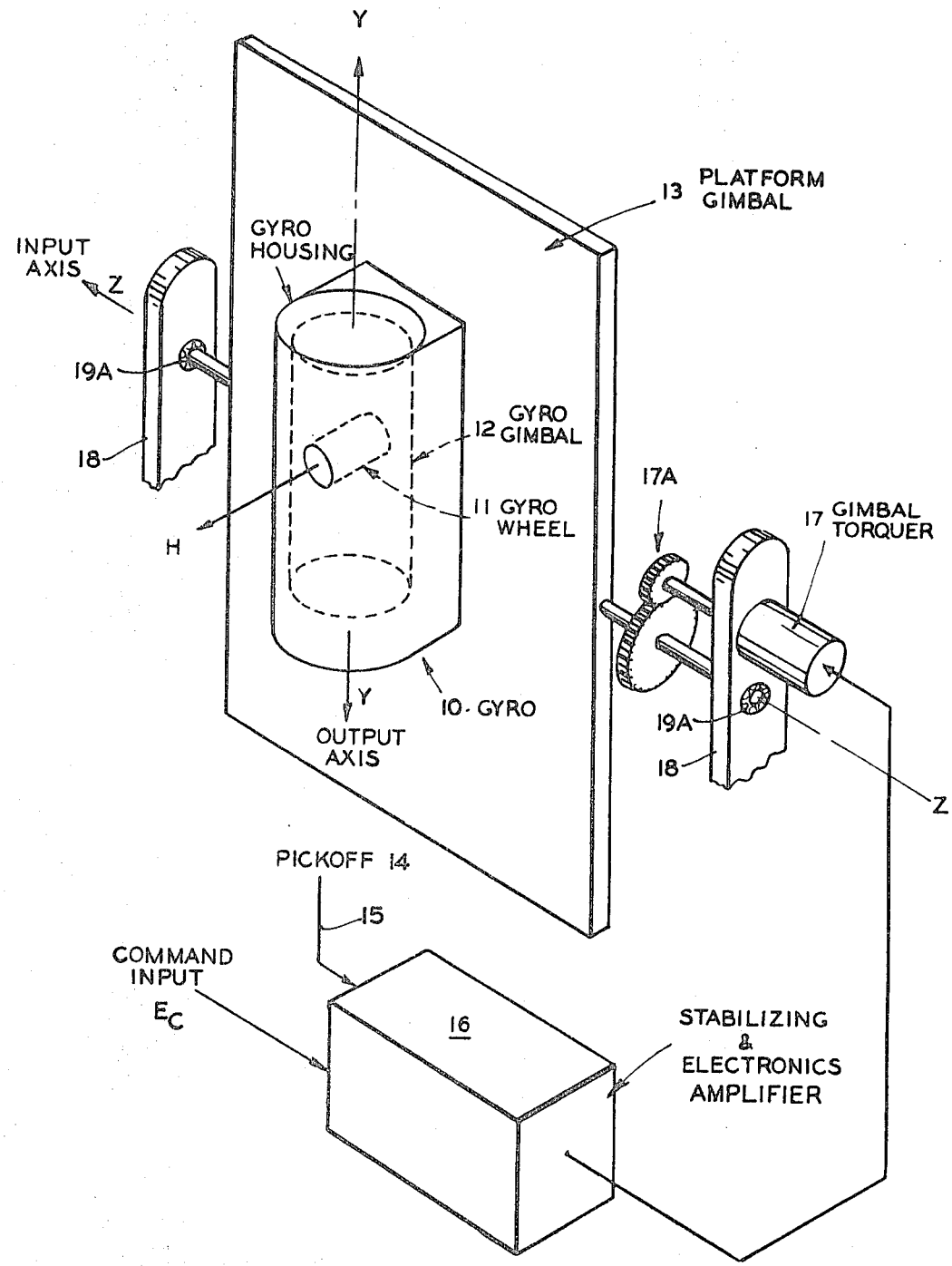
FIG. 1 is an isometric diagrammatical representation of a gyro and its mounted relationship to a platform gimbal according to the invention.
Figure 2:
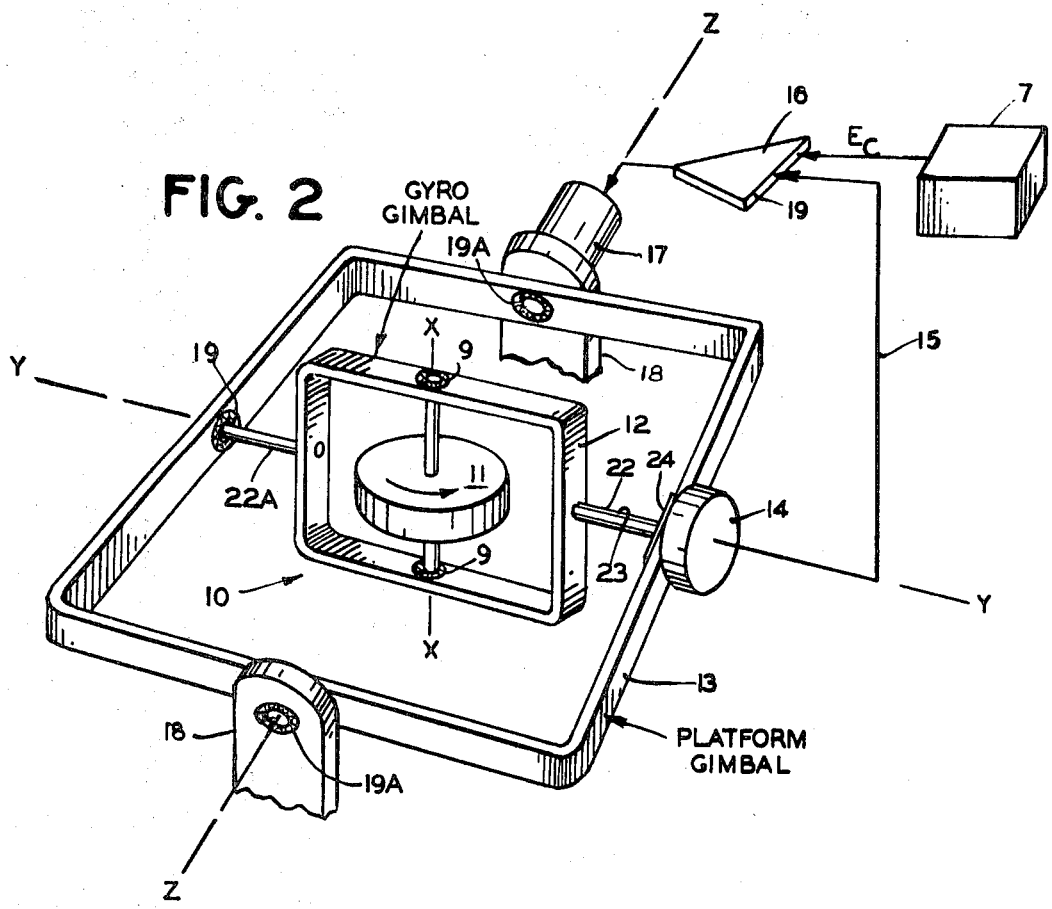
FIG. 2 is an isometric pictorial representation of a gyro embodying the invention.

Referring now to FIGS. 1 and 2 of the drawing, wherein corresponding parts have corresponding numerals, a gyro assembly is indicated generally by the number 10 and is shown, for purposes of illustration, as a single axis gyro. It is understood that the invention is not limited to that type but is applicable to other types of gyros as well. Gyro 10 is mounted on platform gimbal 13 and has a wheel or rotor 11 journaled in a gimbal 12 by bearings 9 for rotation about a spin axis X—X (FIG. 2) by conventional means (not shown). Gimbal 12 is journaled at floats 22 and 22A by bearings 19 (only one of which is shown in FIG. 2) for rotation about an output axis Y—Y. A gyro pickoff 14 is mounted on gimbal 13 and senses movement of gimbal 12 about axis Y—Y. Ordinarily a torquer would be mounted on gimbal 13 and on the side opposite pickoff 14 for rotating gimbal 12 to erect gimbal 13 about input axis Z—Z. The present invention eliminates the need for this torquer as will hereinafter become evident. Platform gimbal 13 is journaled in a housing 18 by bearings 19A for rotation about input axis Z—Z.

Figure 6:
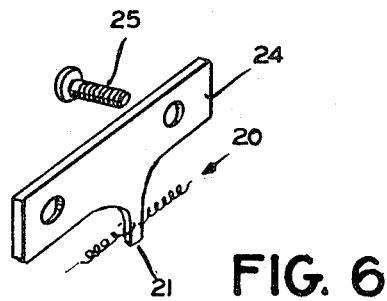
FIG. 6 is an enlarged isometric view of a spring assembly according to the invention.

Pickoff 14 has its output connected by a conductor 15 and through an amplifier 16 including appropriate stabilizing and electronics circuitry to a gimbal torque motor 17 as shown in FIGS. 1 and 2. Motor 17 is connected to rotate platform gimbal 13 through appropriate gearing 17A (FIG. 1) about axis Z—Z. Also connected to the input of amplifier 16 is a signal source 7 providing a command signal $E_c$ for rapid erection of platform gimbal 13 about axis Z—Z, and is used in conjunction with a spring assembly 24 (FIG. 6) which co-acts with a gyro float 22 (FIG. 3) for erecting gimbal 13 as will be next explained.

Figure 3:
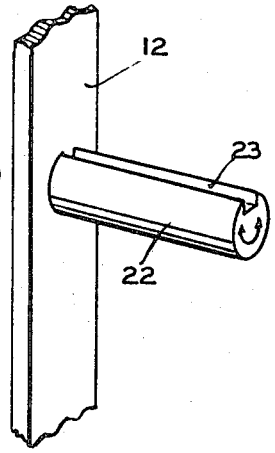
FIG. 3 is an enlarged isometric pictorial representation of a gyro float according to the invention.
Figure 5:
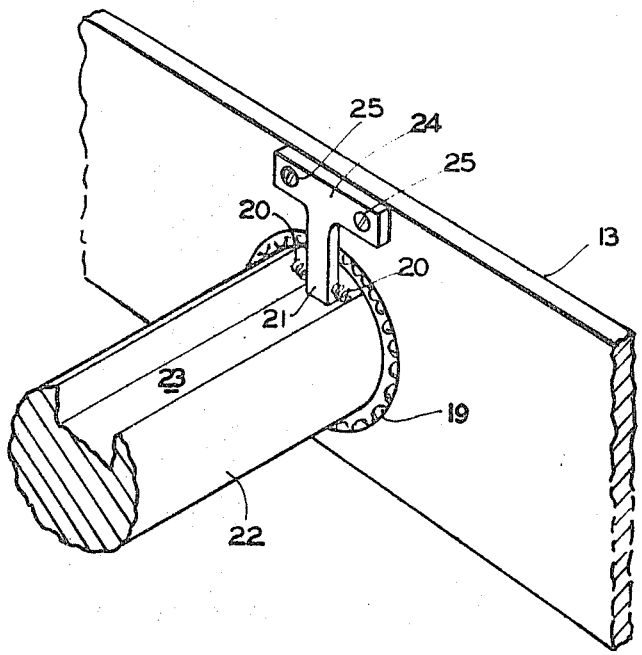
FIG. 5 is an enlarged isometric assembly view of the gyro float and spring and platform gimbal.
Figure 8:
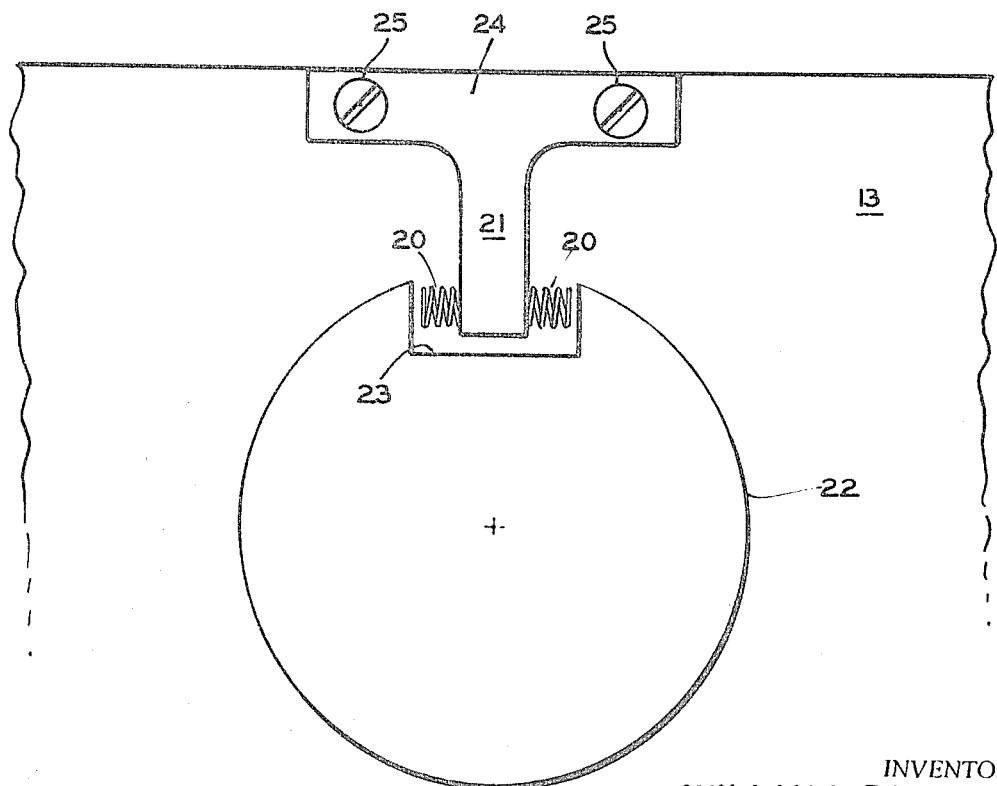
FIG. 8 is a pictorial representation showing the float assembly of FIG. 3 journaled in a platform gimbal.

Reference being made to FIG. 3, it will now be seen that gyro float 22 has a cutout section 23 for receiving spring assembly 24. Assembly 24 is secured to platform gimbal 13 by screws 25 (FIG. 6) and has an arm 21 extending in and normally centered in cutout section 23 as shown in FIGS. 5 and 8. Springs 20 are secured to arm 21 and extend equidistant from each side thereof. In this connection it is to be noted that springs 20 may be rigid enough so as to be free standing in cantilever fashion as shown in the figures or, on the other hand, may be suitably secured at the free ends thereof to assembly 24 as will now be understood by those skilled in the art. Springs 20 are positioned in cutout 23 to allow a predetermined motion of gimbal 12 of, for example, ±2 degrees, without the sides of cutout 23 contacting either of the springs 20.

Figure 4:
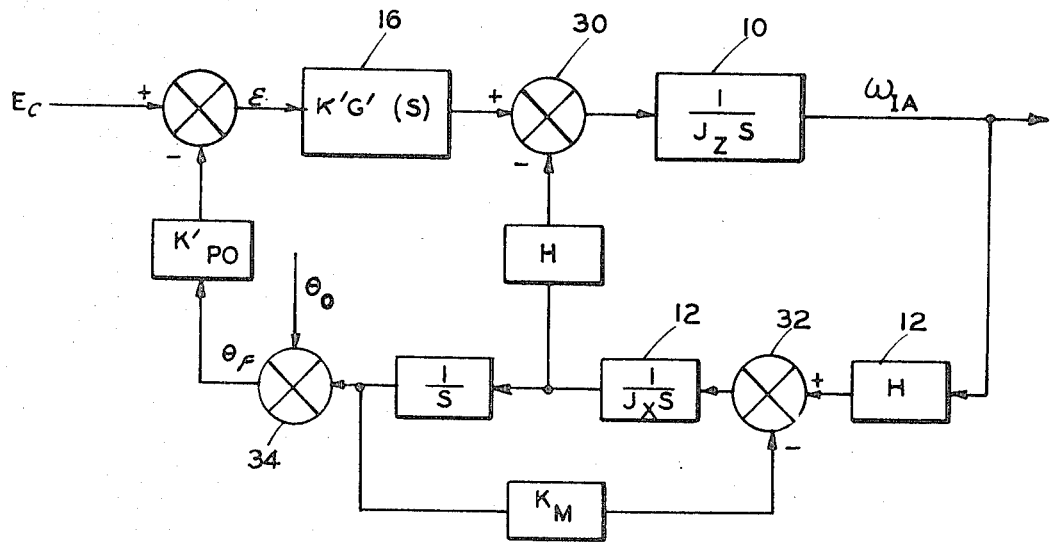
FIG. 4 is a block diagram showing the parameters of an erection system embodying the invention.

Reference is now made to the block diagram of FIG. 4 for a description of a system according to the invention, and wherein the operation of a single axis gimbal erection loop is shown during the time when the sides of cutout 23 are in contact with springs 20.

The parameters shown in FIG. 4 are defined as follows:

K is the electronic gain of amplifier 16;
$G'(s)$ is the transfer function of amplifier 16;
$J_z$ is the moment of inertia of gyro 10;
H is the momentum of gyro wheel 11;
$J_x$ is the moment of inertia of gyro gimbal 12;
$\theta_o$ is an initial displacement of gyro float 22 (if any);
$\theta_f$ is the total displacement of float 22 from null;
$K_m$ is the spring constant of spring 20;
$\epsilon$ is a resultant actuating signal for driving platform gimbal 13 about input axis Z—Z;
$\omega_{IA}$ is the rotational rate of gimbal 13 about axis Z—Z; and the points designated by the numerals 30, 32 and 34 are summation points;

$K'_{po}$ is the D.C. scale factor measured from the angle input of pickoff 14 to the output of a preamplifier (the preamplifier in this case, may be considered as part of amplifier 16, but may be a separate unit as will now be understood by those skilled in the art).

Thus, the required torquing rate is initiated by command voltage $E_c$ applied to amplifier 16. Command signal $E_c$ energizes torquer motor 17 for providing a moment about gyro input axis Z—Z. Gyro 10 senses this moment and through gyroscopic action, float 22 precesses about gyro output axis Y—Y.

As float 22 precesses about output axis Y—Y, a gyroscopic torque is developed about input axis Z—Z opposing the torque provided by command signal $E_c$, thereby holding gimbal 13 initially fixed. The torque on gimbal 13 about input axis Z—Z decreases as float 22 precesses about ouput axis Y—Y and gyro pickoff 14 provides a voltage proportional to float displacement which tends to null out command signal $E_c$.

At the instant the edges of float cutout 23 contact springs 20 causing the springs to deflect, several phenomena occur simultaneously. The rate of precession of float 22 about output axis Y—Y suddenly decreases, thus permitting resultant actuating signal $\epsilon$ to accelerate rotation of platform gimbal 13 about axis Z—Z. A restoring toque is developed on gyro float 22 by spring 20, in a direction to decrease the aforementioned opposing torque, with the net effect being that of increasing torque about input axis Z—Z.

As springs 20 achieve maximum deflection, resultant actuating signal $\epsilon$ decreases until a null voltage is obtained. This null voltage is of sufficient magnitude to overcome any existing frictional torques in platform gimbal bearings 19A. At this time, all torques about input axis Z—Z will be zero and gimbal 13 rotates at a constant rate.

Thus, in the steady-state condition, float 22 precesses through angle $\theta_f$ such that the following condition holds as illustrated by the flow diagram of FIG. 4;

$$\epsilon = E_c - K'_{po}\theta_x \qquad (1)$$

where $K'_{po}$ is the D.C. scale factor measured from the angle input of pickoff 14 to the output of a preamplifier (not shown) which may be part of amplifier 16.

In addition, a spring restoring torque T exists on float 22 as follows;

$$T_R = K_M \theta_{MS} \qquad (2)$$

wherein $K_M$=spring constant of springs 20 and $\theta_{MS}$=deflection angle of springs 20.

This restoring torque is opposed by the gyroscopic torque $T_G = H\omega_{IA}$ due to the rotation of gimbal 13 about the input axis Z—Z. In the steady-state condition, the restoring torque $T_R$ produced by springs 20 is equal and opposite to the gyroscopic torque $T_G$ due to the rotation of gimbal 13, and therefore, the following equilibrium relationship exists:

$$K_M\theta_{MS} = H\omega_{IA} \qquad (3)$$

Figure 7:
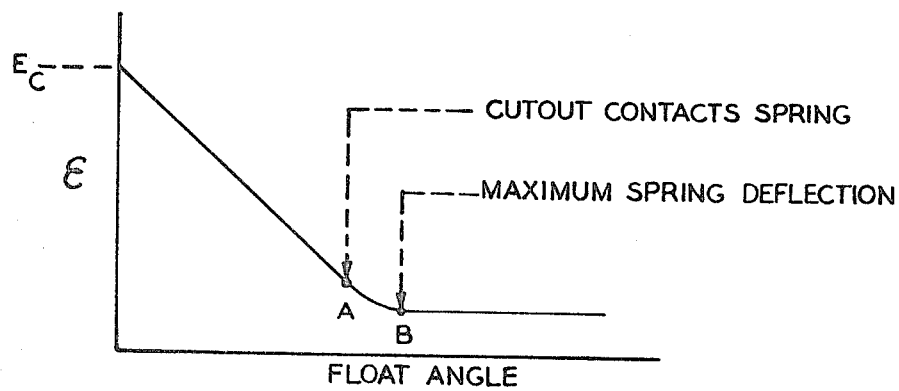
FIG. 7 is a graphical representation showing a curve illustrating the principle of the invention.

The curve of FIG. 7 also serves to explain the invention. Thus, float 22 has a predetermined amount of motion, for example ±2°, before springs 20 contact cutout 23 (point A), and then an additional amount of motion, for example 1°, before contacting (point B) mechanical stops (not shown). Springs 20 may be designed so that spring deflection of 0.5° occurs when platform gimbal 13 is erecting at its maximum rate. Hence, a desired rate of rotation for the gimbal 13 is obtained by an appropriate choice of command signal voltage $E_c$ for each gimbal servo loop, and the mechanical spring constant $K_M$ for each gyro loop.

Although only one embodiment of the invention has been illustrated and described, various changes in the form and relative arrangement of the parts, which will now appear to those skilled in the art, may be made without departing from the scope of the invention.

What is claimed is:

1. An erection system for a gyro platform comprising:
   a platform gimbal journaled in a housing for displacement about an input axis;
   a gyro having a gimbal journaled in the platform gimbal for displacement about an output axis and a rotor journaled in the gyro gimbal;
   means for limiting displacement of the gyro gimbal;
   pickoff means connected to the platform gimbal and responsive to the displacement of the gyro gimbal for providing a corresponding signal;
   means for providing a command signal;
   a torquer coupled to the platform gimbal, and connected to the pickoff means and to the command signal means and affected by the signals therefrom for torquing the platform gimbal about the input axis whereupon the gyro gimbal is displaced through gyroscopic precession about the output axis; and
   the gyro gimbal engaging the displacement limiting means only after a predetermined displacement about the output axis with the limiting means thereupon applying a restoring torque to the gyro gimbal for affecting erection of the platform gimbal about the input axis.

2. An erection system as described by claim 1, wherein the means for limiting displacement of the gyro gimbal includes:
   a pair of gyro floats journaled in the platform gimbal whereby the gyro gimbal precesses about the output axis, with one of said floats having an axially extended cutout therein; and
   a spring assembly secured to the platform gimbal and having spring means centered in the float cut-out so that the gyro gimbal precesses through a predetermined angle before the spring means contact the sides of the float cutout to limit said precession.

3. An erection system as described by claim 1, wherein:
   the command signal means affects the torquer for torquing the platform gimbal about the input axis ine one sense; and
   the pickoff affects the torquer for torquing the platform gimbal about the input axis in an opposite sense so that initially the torques in the one and the opposite senses cancel each other out.

4. An erection system as described by claim 3, including:
   an amplifier connected to the pickoff and connected to the commnd signal means for summing the signals therefrom; and
   the torquer being responsive to the summation signal for torquing the platform gimbal about the input axis.

5. An erection system as described by claim 4, wherein:
   the summation signal corresponds to the difference between the command signal and the total angular displacement of the gyro gimbal multiplied by the D.C. scale factor measured from the angle input of the pickoff to the output of the amplifier.

6. An erection system as described by claim 2, wherein:
   the spring means contact the sides of the float cut-out after the gyro gimbal precesses through the predetermined angle whereby said spring means deflects to develop a restoring torque on the gyro gimbal.

7. An erection system as described by claim 6, wherein:
   the restoring torque corresponds to the product of the spring constant and the deflection angle of said spring means.

8. An erection system as described by claim 1, wherein:
   in the steady state condition the restoring torque corresponds to the product of the gyro rotor momentum and the rotational rate of the platform gimbal.

9. An erection system as described by claim 2, wherein the spring assembly comprises:
   a member adopted to be secured to the platform gimbal;

an arm extending normally from said member; and a pair of springs secured to the arm and extending in cantilever fashion in opposing relation equidistant from said arm and substantially parallel to said member.

References Cited

UNITED STATES PATENTS

| | | | |
|---|---|---|---|
| 1,906,719 | 5/1933 | Richter | 74—5.41 |
| 2,711,651 | 6/1955 | Bonnefont | 74—5.4 |
| 3,241,389 | 3/1966 | Brouwer | 74—5.6 |
| 3,456,511 | 7/1969 | Clark et al. | 74—5.6 X |
| 3,470,751 | 10/1969 | Wendt | 74—5.6 X |

MANUEL A. ANTONAKAS, Primary Examiner

U.S. Cl. X.R.

74—5.6